US010417592B2

(12) United States Patent
Byk et al.

(10) Patent No.: US 10,417,592 B2
(45) Date of Patent: Sep. 17, 2019

(54) RESOURCE ALLOCATION AND RISK MODELING FOR GEOGRAPHICALLY DISTRIBUTED ASSETS

(71) Applicant: Risk Management Solutions, Inc., Newark, NJ (US)

(72) Inventors: Jordan Byk, Morris Plains, NJ (US); Christopher Sams, San Francisco, CA (US); David Carttar, Lawrence, KS (US); Monalisa Samal, Noida (IN); Surender Kumar, Delhi (IN)

(73) Assignee: Risk Management Solutions, Inc., Newark, CA (US)

( * ) Notice: Subject to any disclaimer, the term of this patent is extended or adjusted under 35 U.S.C. 154(b) by 996 days.

(21) Appl. No.: 14/070,843

(22) Filed: Nov. 4, 2013

(65) Prior Publication Data

US 2014/0278708 A1    Sep. 18, 2014

Related U.S. Application Data

(60) Provisional application No. 61/779,206, filed on Mar. 13, 2013.

(51) Int. Cl.
*G06Q 30/06* (2012.01)
*G06Q 10/06* (2012.01)

(52) U.S. Cl.
CPC .............................. *G06Q 10/06315* (2013.01)

(58) Field of Classification Search
None
See application file for complete search history.

(56) References Cited

U.S. PATENT DOCUMENTS

2003/0107490 A1* 6/2003 Sznaider ............... G08B 21/10
                                                     340/601
2006/0123482 A1   6/2006 Aaron
(Continued)

FOREIGN PATENT DOCUMENTS

JP    2007-528510 A    10/2007
JP    2009-529189 A    8/2009

OTHER PUBLICATIONS

Australian First Examination Report, Australian Application No. 2014201100, dated Apr. 24, 2015, 4 pages.
(Continued)

*Primary Examiner* — Eric W Stamber
*Assistant Examiner* — Alan Torrico-Lopez
(74) *Attorney, Agent, or Firm* — Hickman Palermo Becker Bingham LLP (57) ABSTRACT

A risk exposure model is developed for network or moveable assets not specific to a single, fixed address or location. An asset map using a plurality of geographic representation points is used to identify the physical locations of the asset portions (or possible physical locations in the case of a moveable asset). Baseline geographic, geologic, political, and demographic data is similarly represented using geographic representation points. Meta-data associated with each geographic representation point is used to identify details related to the asset or baseline feature at that geographic location. Risk exposure values are then calculated using the geographic representation points specific to the asset portions that are subject to risks associated with the location of the asset portion.

24 Claims, 7 Drawing Sheets

(56) References Cited

U.S. PATENT DOCUMENTS

| | | | |
|---|---|---|---|
| 2007/0041333 A1* | 2/2007 | Twitchell, Jr. | G08B 25/009 370/252 |
| 2007/0118291 A1* | 5/2007 | Carttar | G06F 16/29 702/5 |
| 2007/0214023 A1* | 9/2007 | Mathai | G01W 1/00 705/4 |
| 2010/0131202 A1* | 5/2010 | Dannevik | G01W 1/00 702/3 |
| 2011/0196810 A1* | 8/2011 | Bertogg | G06Q 40/08 705/36 R |
| 2012/0059684 A1 | 3/2012 | Hampapur et al. | |

OTHER PUBLICATIONS

Japanese Office Action, Japanese Application No. 2014-050309, dated Apr. 7, 2015, 15 pages.
Australian Second Examination Report, Australian Application No. 2014201100, dated Aug. 4, 2015, 4 pages.
Japanese Second Office Action, Japanese Application No. 2014-050309, dated Dec. 8, 2015, 9 pages.

* cited by examiner

RESOURCE ALLOCATION AND RISK MODELING FOR GEOGRAPHICALLY DISTRIBUTED ASSETS

CROSS REFERENCE TO RELATED APPLICATIONS

This application claims the benefit of U.S. Provisional Application No. 61/779,206 filed Mar. 13, 2013, which is incorporated by reference in its entirety.

FIELD

Embodiments of the present disclosure relate generally to systems and methods for apportioning resources among geographically distributed parts of a large facility or asset, such as a railroad system. More specifically, embodiments of the present disclosure relate to resource allocation and risk modeling for geographically distributed assets using geographic representation points for the asset.

BACKGROUND

Many municipalities, governmental units, and private businesses have assets located at a variety of locations, such as factories located in several cities across the country or around the world. For various reasons, it may be important to consider risks to these locations and allocation of resources among such facilities. Such geographically distributed facilities may be thought of based on the area that they cover (e.g., the Midwest region restaurants of a fast food chain) or based on the network that they define (e.g., the network of an electric power distribution company).

As a specific example, a company that supplies ground transportation provides tractor-trailers to multiple ports around a country for hauling imports and products from each port to an inland destination. There are numerous reasons to supply the ports with a certain number of transportation assets (e.g., tractor-trailers, cargo trailers, loading equipment, repair equipment) which changes over time. The assets supplied to each port may differ for any of a variety of reasons that may or may not remain constant. For example, if one set of ports are experiencing labor difficulties, there may be need to dynamically shift transportation assets to another port as cargo ships are diverted, and then shift them back as labor issues are resolved.

In another example, a utility company may attempt to anticipate the potential impact of inclement weather and gauge the appropriate response, limited by finite funds and/or resources. Because of this limitation, the utility company strives to identify areas of its network at the greatest risk to a variety of issues, such as trees felled by wind or snow. In this setting, the utility company attempts to determine the optimal mix of spare equipment (e.g., poles, wire, transformers) used to respond to the event, and appropriately distribute the spare equipment across a number of staging areas (perhaps 50 locations throughout a geographic service area). Similarly, the utility company strives to optimize limited funds for engaging third parties (e.g., tree service contractors) to perform preventative maintenance along thousands of miles of roadways within its service area.

As another example, a fast food restaurant chain may have several hundred locations around the country. The headquarters of the company must determine, based on a wide variety of factors, how much of each food item to supply to each restaurant.

Such determinations apply in a wide variety of situations. For instance, aid organizations (e.g., the Red Cross, FEMA) maintain stocks of various disaster relief items in various warehouses. When a major weather event such as a hurricane is forecast, it may be advantageous to move supplies from one warehouse (e.g., in an area not likely to be impacted) to another (e.g., closer to the area likely to be impacted). Counter-intuitively, in some situations it may also be important to move supplies away from an area likely to be impacted, particularly if there is a threat that the supplies will be compromised by the catastrophic event if left at their current location.

Consider the operations of a railroad or municipal transportation authority. Knowing where to store operating equipment and stage spare equipment (rail, railcars, electrical transformers, and the like) can be critical to reducing downtime in the event of a catastrophic event, such as the storm surge that impacted the New York Subway system as a result of Tropical Storm Sandy in 2012.

Similar modeling and planning can be used in other industries as well. The insurance industry may well seek to model the impact of catastrophic events on various insured properties. In that industry, multiple layers of insurers have often-overlapping coverage, all with limits (e.g., caps) and other constraints. Further, catastrophic events, even if randomly distributed, are sometimes bunched so that exposure seems unusually high. In addition, some catastrophic events tend not to be independent but instead are tied together, e.g., (a) a weather pattern breeds multiple cyclonic events during a single season; (b) a large earthquake is accompanied by a tsunami and numerous aftershocks; (c) a terrorist attack is not isolated but is planned as one of several coordinated attacks. Continuous geographic distribution of insured assets such as a rail system complicates planning in various ways, so interest in modeling is particularly great in the insurance industry.

Determining the geospatial locations and how to best to allocate resources (e.g., electrical wires or train rails) to geographically diverse assets has traditionally been accomplished as a combination of geocoding and operations research. Geocoding conventionally uses location information such as an address or latitude/longitude coordinates as a representation of each asset under consideration (e.g., each fast food restaurant). Operations research takes a number of factors, including the location information, as a means to optimize the allocation of assets.

However, not all assets are readily described or optimized in this manner. Railroads, utility transmission lines, gas and oil pipelines and the like are continuously distributed throughout their geographic range, and in any event often do not have conventional physical addresses corresponding to the locations of their component parts. Many variables, such as the value of infrastructure, are not intended to be "optimized," but rather just allocated.

The New York City Subway system, for example, has some two dozen rail yards, in addition to more than 200 miles of track on its two dozen or so routes. Some of these rail yards have dozens of tracks, with all of the associated switching devices and controls. Thus, the amount of spare equipment needed nearby to restore operation to the yards after a catastrophic event may be orders of magnitude more for the yards than for the route segments of the system. However, unlike the food delivery requirements for a group of fast food restaurants, the distribution of resource needs for the New York Subway system are based on continuous (rather than discrete) geographical distributions.

Consider now an insurance perspective on an asset that has continuous geographic distribution, such as the New York Subway system. Using computerized models, underwriters seek to price risk based on the evaluation of the probability of loss for a particular location and property type as well as manage portfolios of risks according to the degree to which losses correlate from one location to another as part of the same catastrophe event. These probabilistic (stochastic) catastrophe models include, but are not limited to, earthquake, fire following earthquake, tropical cyclone (hurricanes, typhoons, and cyclones), extra-tropical cyclone (windstorm), storm-surge, river flooding, tornadoes, hailstorms, terrorism and other types of catastrophe events. These catastrophe models are built upon detailed geographical databases describing highly localized variations in hazard characteristics, as well as databases capturing property and casualty inventory, building stock, and insurance exposure information.

Modeling systems using these models allow catastrophe managers, analysts, underwriters and others in the insurance markets (and elsewhere) to capture risk exposure data, to analyze risk for individual accounts or portfolios, to monitor risk aggregates, and to set business strategy. Typical catastrophe modeling systems are built around a geographical model comprising exposure information for individual locations, specific bounded locations or areas. These locations or areas of interest are typically defined using for example, a street address, postal code boundaries, including ZIP codes, city (or other administrative) boundaries, electoral or census ward boundaries and similar bounded geopolitical subdivisions.

A drawback of using these types of mechanisms (e.g., postal boundaries, cities, municipalities, building IDs, or ZIP codes) to define locations or areas is that some portions of an asset may not have an address or representative geopolitical boundaries that can be used to meaningfully characterize their corresponding risk exposures. Indeed, some portions of the asset (e.g, train cars, locomotives, cargo) may themselves be moveable properties without a fixed location.

Another drawback of these types of mechanisms to define locations or areas is that they do not allow the system or user the flexibility to select different resolutions that would provide the better geospatial representations of the asset. In addition, it may be very difficult to identify a single location that characterizes the risk of the whole geographic area.

These and other drawbacks exist. For asset portions having a fixed location but not a corresponding conventional address, use of a proxy such as ZIP code may result in extremely poor asset allocations and modeling results. For asset portions that are moveable, modeling that assumes the asset to be at a single geographic location again may poorly represent the actual exposure for any particular catastrophic event.

DETAILED DESCRIPTION OF THE DRAWINGS

Embodiments described herein include methods and systems for developing risk exposure models for assets that are networks or are moveable and therefore are not specific to an address or a single location. The embodiments described herein can also be applied to resource allocation modeling for supplying or servicing asset portions of a distributed asset. The models and systems herein use an asset map to describe the distributed nature of a network or a moveable asset. An asset map characterizes the asset using a plurality of geographic representations (points, lines, bounded areas) to identify the physical locations of portions of the network asset (or possible physical locations in the case of a moveable asset). Meta-data is associated with each geographic representation point reciting details related to the asset portion at that geographic location. Examples of meta-data include geographic coordinates (e.g., GPS coordinates, latitude/longitude) of the asset portion, asset capacity, asset flow or directionality, asset connectivity within and to other asset portions, asset portion type (e.g., network, electrical grid substation, bridge, tunnel, storage, maintenance), and others.

The models and systems also include a baseline map that describes the context in which the network or moveable asset portions are disposed. For example, the baseline map can include information typically described in a GIS map such as public infrastructure (e.g., roads, bridges), private infrastructure (e.g., electrical grid elements), and features of the natural landscape (e.g., waterways, flood zones, earthquake faults), as well as political boundaries, population density, demographics, and other similar information. As with the assets, these features of the baseline map can also be described by meta-data that characterizes the features.

The asset map and the baseline map are used in cooperation to identify intersections between asset portions and risks posed by baseline features (such as geographical features or the physical surroundings of an asset portion), thereby using the intersection and the meta-data associated with the intersecting asset and baseline feature to quantify the risk (also termed a "risk exposure") to the asset as well as a risk exposure value (i.e., the potential financial liability that may be incurred by a party or parties by destruction or damage to the asset from a catastrophe). These intersections are described as "points" in this disclosure.

The terms "geographic representations" and/or "geospatial representations" are used in this disclosure to generically describe polygons, single or multi-segment lines, points or other geometric structures that capture the physical outline of an asset and/or a baseline feature. The term "map" is used solely for convenience of explanation. It will be understood that the generation of a map from data is not necessary, and that the methods and systems described below can determine risk exposure values using data in other forms, not merely graphically or visually represented data.

The methods and systems described herein can also be used for supply chain management by forecasting demand and consumption of discrete assets distributed over a large area (e.g., a set of restaurants of a chain distributed throughout a geographic region). Categories of use include, but are not limited to, personnel assignments, resource and asset (e.g. spare equipment) allocation, maintenance scheduling and completion, location planning and business case support (particularly for larger commercial and industrial facilities where critical infrastructure failures can interrupt operations), corporate disaster planning and response, and analysis of other similar scenarios involving allocation of limited or time-sensitive resources.

Geographic Representation Points of Network and Moveable Assets

Figure 1A:
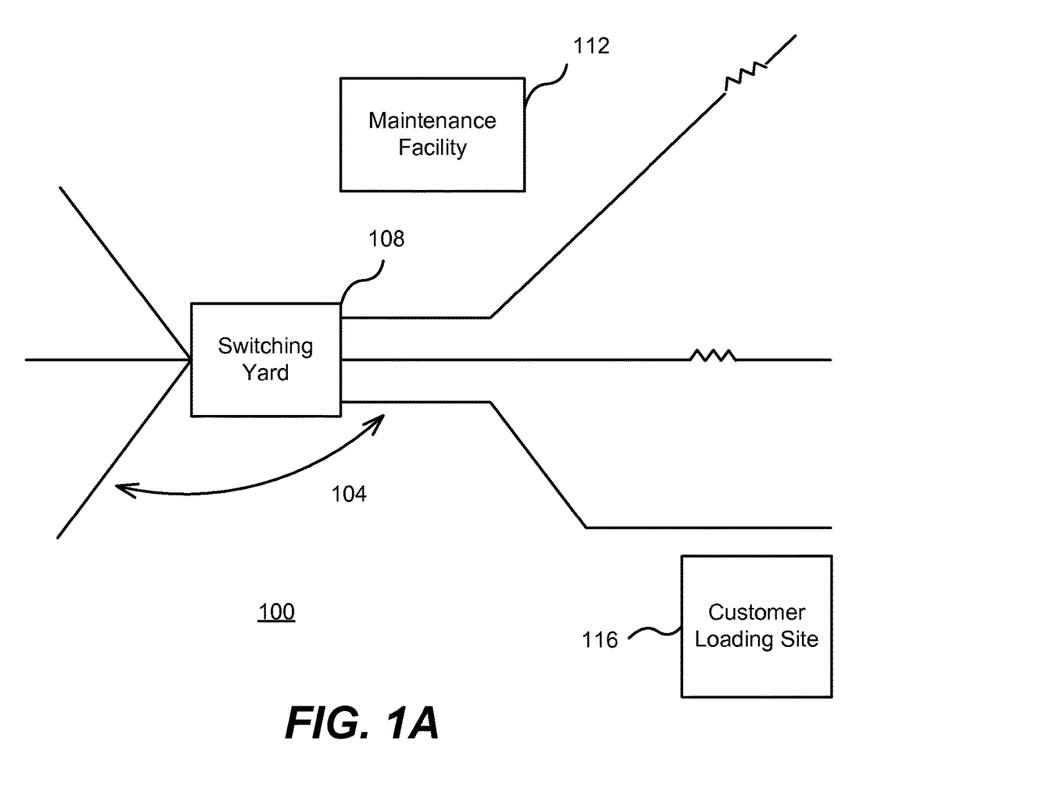
FIG. 1A is a schematic representation of a network asset that is a portion of a rail system which includes asset portions or sub-assets according to one embodiment.

FIG. 1A is a schematic representation a portion of a rail system 100, which in this example is described as a network asset because its physical infrastructure is localized (e.g., to rail beds and/or buildings) but is also distributed over a geographic area. The rail system includes at least one rail 104, a switching yard 108, a maintenance facility 112, and a customer loading site 116 (described collectively as "sub-assets" of the rail system 100).

The various example components of the rail system 100 that are shown illustrate the diversity of sub-asset types that are included in the rail system 100 asset as a whole, and also can illustrate the variation in both time and geographic location of the value (and therefore the risk exposure value) of the sub-assets. For example, a value of the switching yard 108, and similarly a value of the maintenance facility 112 will be much higher when multiple trains are at one of these locations at the same time. Correspondingly, the risk exposure value will be higher in this case because, in the event of a catastrophe, the financial loss of multiple trains as well as the physical structure of the switching yard 108 will be higher than the financial loss of the physical structure of the switching yard alone. Similarly, a value of the customer loading site 116 is higher when a train is at the customer loading site and the site itself contains inventory. This is in contrast to a value of the customer loading site 116 after a train loaded with inventory has departed, leaving the site as merely an empty warehouse. As in the example of the switching yard 108, the risk exposure value is higher when the train is at the customer loading site 116 and the site is filled with inventory.

Alternatively, the asset of a train and an asset of the switching yard 108 can be treated as separate assets using the methods and systems described herein. That is, because the methods and systems herein can be applied to moveable assets, a risk exposure value of a train can be determined and/or calculated as a function of its location, and also maintained separately from the switching yard 108 asset.

Two features of the present disclosure are used to describe these variations in value and risk as a function of both time and geographic location: a variable resolution grid and geographic representation points.

Figure 1B:
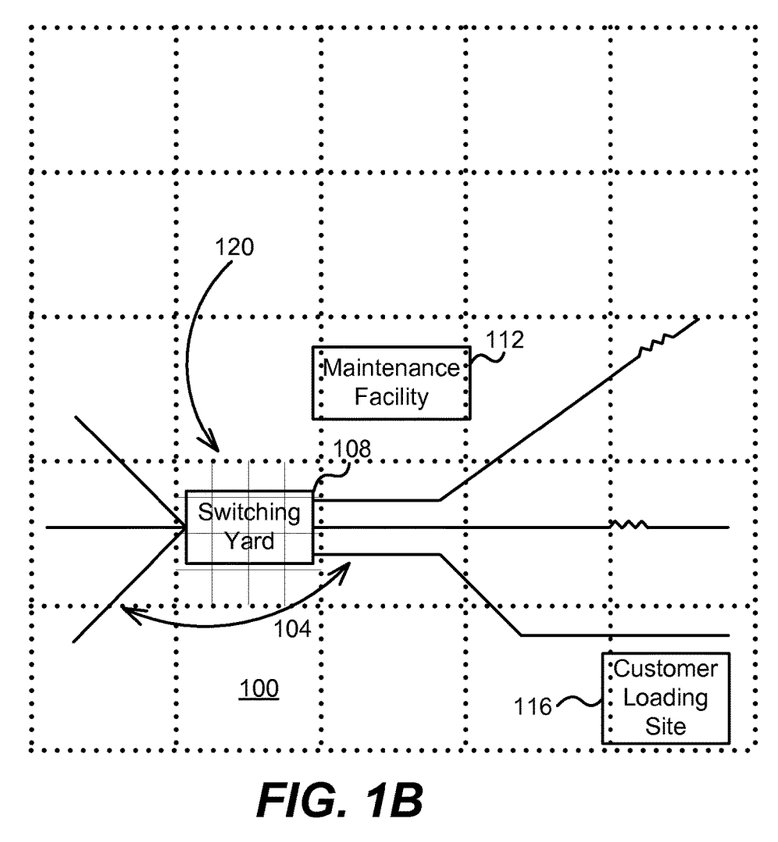
FIG. 1B is an illustration of a network asset having multiple sub-assets that is analyzed using a variable resolution grid according to one embodiment.

A variable resolution grid can be used to provide levels of detail to an asset map and/or a baseline map proportional to the value of an asset, a density of assets at a particular map location, and/or a level of risk that is a function of conditions local to all spans or an area of the asset. In other words, a variable resolution grid provides a way of focusing specific concentrations of exposures on a geographical grid to determine projected loss caused by a catastrophe. Other embodiments of variable resolution include a user-selectable "uniform resolution grid," a user-selectable line interval (rather than a grid), user-selectable regular intervals for use with the geographic representation points of a distributed asset, and other similar configurations. FIG. 1B illustrates an application of a variable resolution grid to the rail system 100 of FIG. 1A. In this case, the finest resolution of the grid 120 is coincident with the assets having a highest density of asset value and/or asset risk, in this case the switching yard 108. Variable resolution grids and their applications are described in U.S. Pat. No. 8,229,766, which is incorporated by reference in its entirety.

Figure 2A:
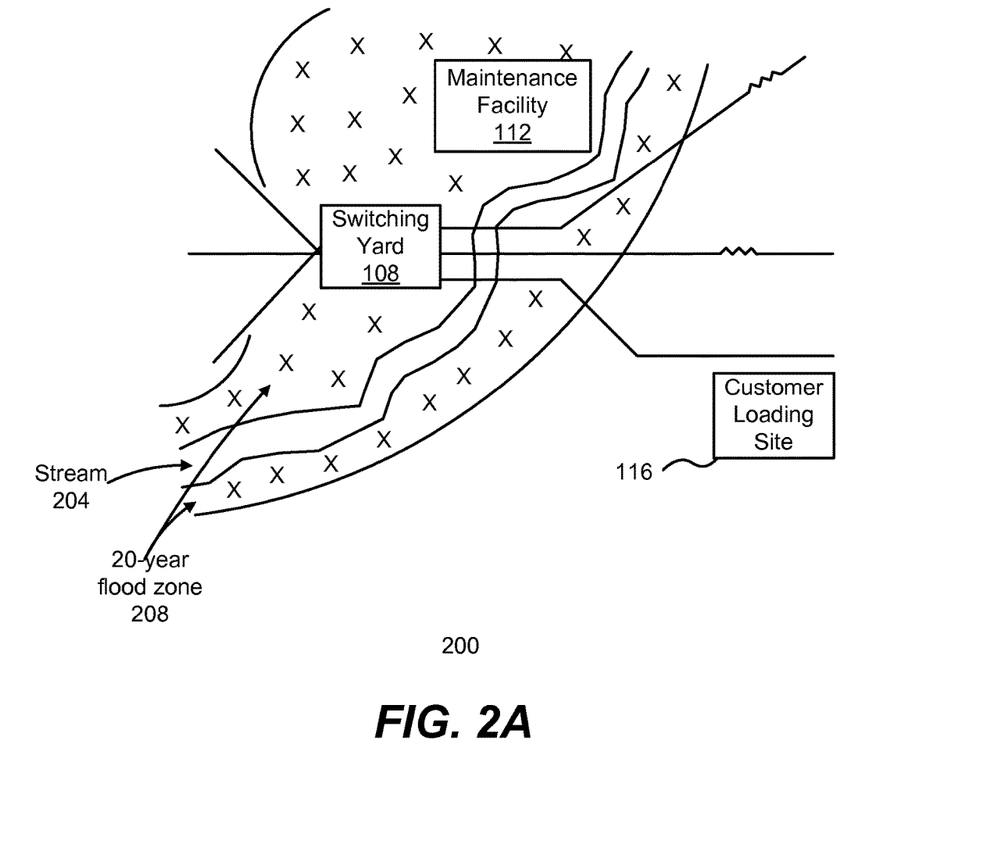
FIG. 2A is an illustration of a network asset map that has been overlayed with a baseline map, thereby creating a combined map showing assets in the context of baseline features, according to one embodiment.
Figure 2B:
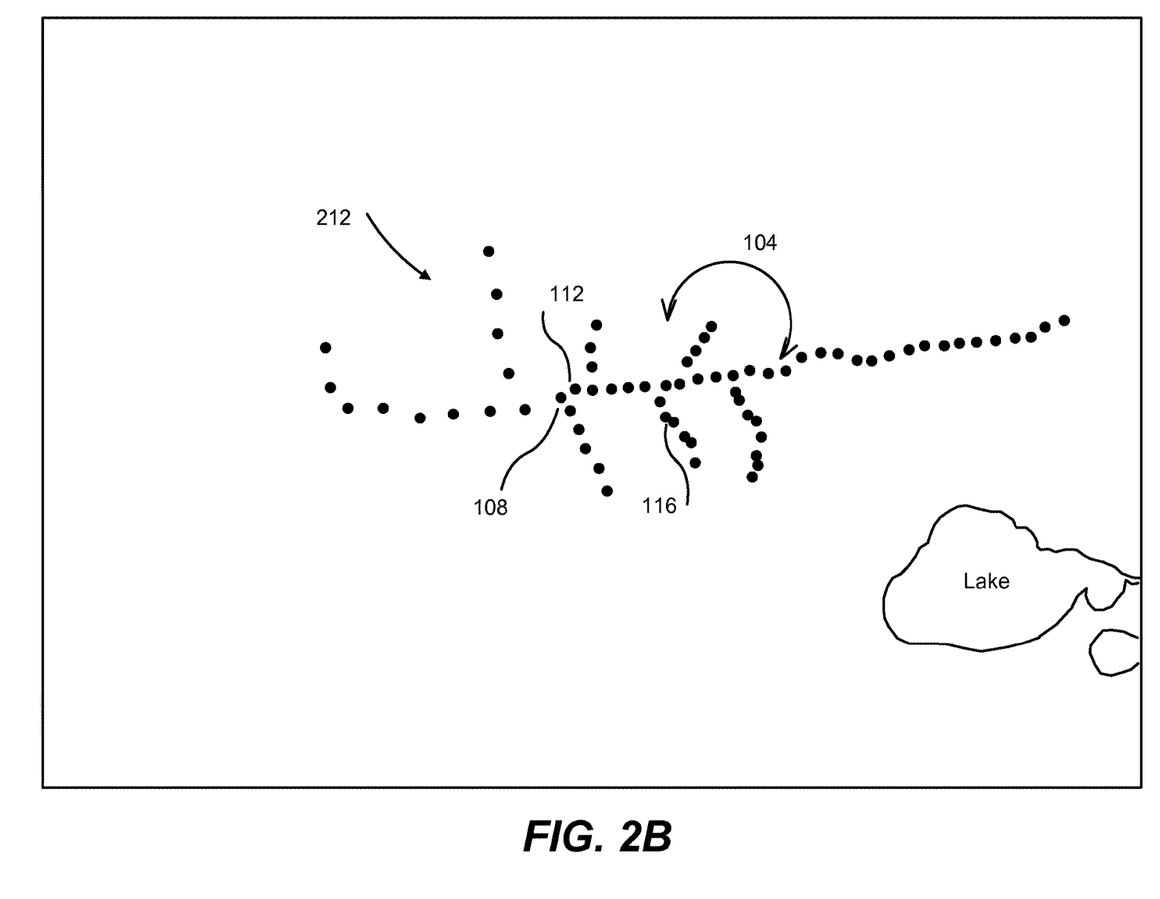
FIG. 2B is an illustration of using geographic representation points to characterize intersections of a network asset with baseline features according to one embodiment.

Geographic representation points, illustrated as the filled circles shown in FIG. 2B, are used to represent the intersections between the geographic representation of an asset (in this case a rail system) and a baseline feature(s). The benefits of using these geographic representation points are two-fold. First, the network nature of the asset can be matched to baseline data (e.g., geographic features, public infrastructure, and geologic features) thereby identifying specific network asset geographic locations to geographically specific risk factors. This will be described in more detail in the context of FIGS. 2A, 2B, and 3. Second, each of the geographic representation points can have associated meta-data that quantifies the asset (or sub-asset) type, location, and other characteristics that can be used to quantify characteristics of the asset or be used with other information to quantify the risk exposure value associated with a geographical representation point. Third, the number of geographic representation points and the interval between them is proportional to the density of intersections between the asset portions and the risks posed by baseline features.

Baseline Maps and Risk Value Exposure Determination Method

FIG. 2A is a schematic illustration of a combined map 200 that includes the portions of the rail system 100 of FIG. 1A that has been superimposed on a baseline map showing, in this example, geologic features that can pose risks to the asset and/or sub-assets. The combined map 200 of this example shows not only the sub-assets of FIG. 1A, but also a stream 204 and a 20-year flood zone 208 surrounding the stream.

As is shown, the stream 204 flows by the switching yard 108, indicating the locations of bridges and significant infrastructure relative to other portions of the assets. The addition of the 20-year flood zone 208 to the combined map 200, which can be accessed using a publicly available GIS database, indicates different levels of flooding risk to the sub-assets. That is, because the switching yard 108 and the maintenance facility 112 are in the 20-year flood zone 208 surrounding the stream 204 will reflect a higher flooding risk (and therefore a higher risk exposure value) compared to the customer loading site 116, which is outside the flood zone.

FIG. 2B illustrates a set of geographic representation points 212 that indicate intersections between the geographic representations of asset portions and baseline features. As described above, each point provides a user with meta-data describing the asset portion and the intersecting baseline feature, including risks, locations, and the like. As also described above, the spacing between the geographic representation points of the set 212 varies as a function of the risks posed, the density of assets, and/or the asset value.

Figure 3:
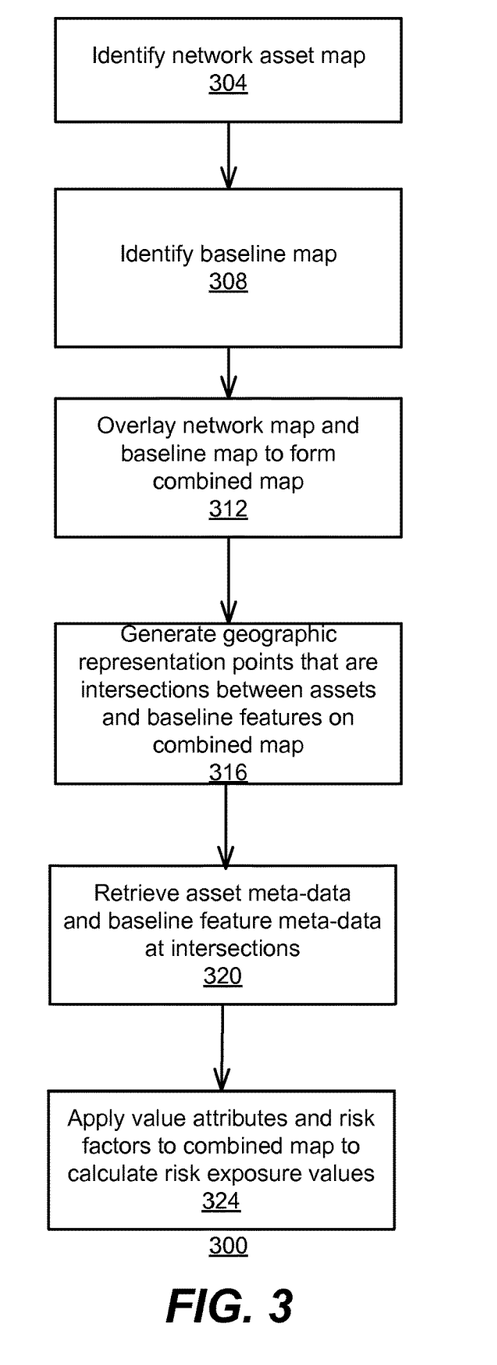
FIG. 3 is a flow diagram of a method for calculating risk exposure values using a network asset map, a baseline map, and their associated meta-data, according to one embodiment.

FIG. 3 shows a method 300 for creating a combined map and calculating risk exposure values using geographic representation points, their associated meta-data, and the meta-data associated with features of a baseline map. As described above in FIG. 1A, a map of geographic representations (points, polygons, lines, multi-segment lines, etc.) of a network asset (or data corresponding to and characterizing the locations, features, etc. of a network asset) are identified 304. The map includes the geographic locations and/or coordinates of the various sub-assets and components of the network asset, reflecting discrete locations of asset portions. Associated with the geographic representations of the network map are meta-data that describe, characterize, or identify a portion of the network at that point.

A baseline map is identified 308 that describes the various geographic, geologic, political, and/or other features characterizing the setting of the asset that can pose risks to the asset, or portions thereof. As described above, the baseline map also uses geographic representations (points, polygons, lines, multi-segment lines, etc.), and associated meta-data to describe the physical outline of the baseline feature and the risk factors posed to the asset by the baseline feature. Returning to the example shown in FIG. 2, a multi-segment line can be used in the baseline map to trace the path of the stream 204 and one or more polygons can be used in the baseline map to identify the limits of the 20-year flood zone 208. Meta-data associated with the lines representing stream 204 can include, for example, geographic end-points of line-segments of the stream, its average flow rate, its flood stage flow rate, its flooding frequency, and other similar risk factors. Similarly, meta-data associated with the polygon representing the 20-year flood zone can include flooding frequency, flooding probability as a function of location within the flood zone, typical flooding dates, distance from local emergency services, and other similar information.

The network map and baseline maps (or non-graphical data) are overlayed 312 (or otherwise associated with one another for combined analysis and other use) to form a combined map. The combined map, showing both asset and baseline features, can then be used to generate geographic representation points 316 that are intersections of the geographic representations of the asset (or portions thereof) and proximate baseline features. It is these intersections of asset portions and risk for which risk exposure values are calculated.

In some examples, multiple variable resolution grids are used with either or both of the network map or the baseline map. The variable resolution grid, as described in U.S. Pat. No. 8,229,766 and incorporated by reference herein, provides a method for providing added detail to assets or baseline features when warranted. For example, some assets may have discrete concentrations of value (e.g., the switching yard 108) and some baseline features may have discrete concentrations of risk (e.g., the 20-year flood plain 208). Using a variable resolution grid to support additional meta-data for these discrete locations is helpful for creating an accurate risk exposure value. Furthermore, using a variable resolution grid that lacks such meta-data for assets or baseline features that do not warrant additional detail facilitates an efficient use of computational resources.

The meta-data associated with a geographic representation point generally describes a location of a point in one or more coordinate systems, such as a geographic coordinate system (e.g., by using a GPS coordinates, latitude and longitude, elevation) and/or a political coordinate system (e.g., street address). The meta-data of a geographic representation point also includes information describing the asset or sub-asset represented by the point. This information includes, but is not limited, to an owner and/or operator of the asset and/or sub-asset, a value (which can also include a value as a function of time, as described in the example of the switching yard 108), a description or type of asset, a composition of the asset (e.g., rails, buildings, maintenance equipment), and other similar data used to quantify an asset value. In other examples the meta-data does not include asset value, which is supplied separately.

Upon generating 316 the geographic representation points of the intersections, the meta-data associated with both the asset (or portions thereof) and the baseline feature are retrieved. These data can be retrieved from a private source (such as an insurance industry database or a common carrier database) or a public source (such as a government sponsored GIS database). Regardless of the source, these data are used to quantify a value of the asset and establish risk factors due to the asset map and baseline features. These are then used to calculate 324 a risk exposure value.

The calculation 324 of a risk exposure value is performed using conventional methods. For example, in one embodiment a user assigns a weighing factor representing duration, frequency, time of year or seasonality, asset type, baseline feature type, risk type or other similar risk or value factor. These weighing factors are used to compensate for an absence of meta-data describing either or both of the asset or feature. These various weights are then multiplied to calculate a final weighing factor associated with the geographic representation point. The final weighing factor is then multiplied by the asset (or asset portion) value to determine the risk exposure value associated the geographic representation point of the intersection.

In this way, the risk exposure value is assigned only to the portion of the network or distributed asset that is actually exposed to the risk and not inaccurately distributed to the entire asset (or to a larger-than-needed portion of the asset). The benefit of this method is that risk exposure values are more precisely associated with specific sub-assets or portions of network assets or assets that are not otherwise assignable to a single, fixed address. Aspects of the method 300 have already been provided above in the context of a network asset (rail system 100). Another particular application is for assets that are moveable, such as inventory that is transported in a train car or a truck. The risk exposure to the inventory can change as a function of the location of the transporting vehicle, the time of year, route, duration of the trip, etc. For example, the risk exposure to inventory being transported by vessel during hurricane season in a coastal area could be greater than the same inventory being transported on inland rivers or lakes during the same time of year.

Risk Value Determination System and System Environment

Figure 4A:
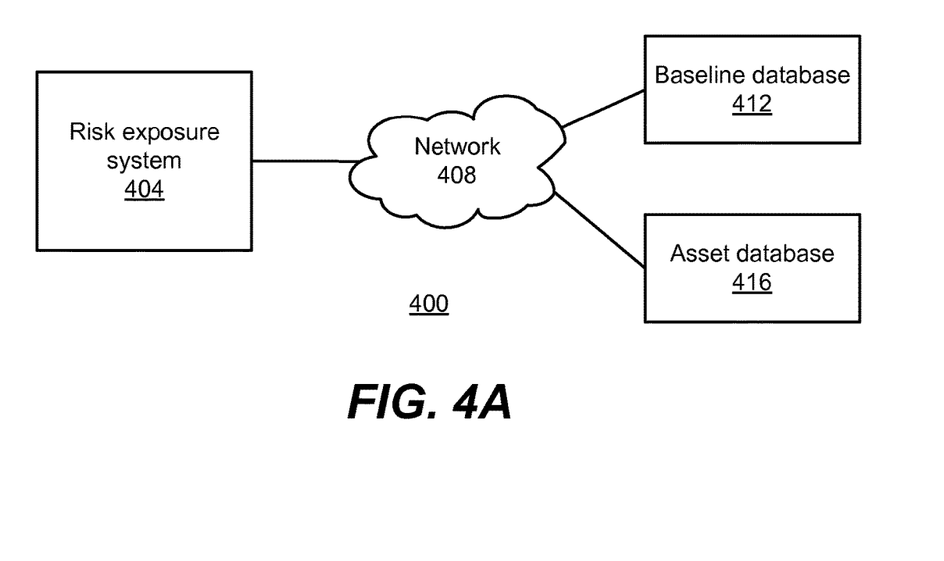
FIGS. 4A and 4B illustrate a network environment and a system architecture, respectively, of a system for calculating risk exposure values according to one embodiment.

FIG. 4A illustrates an example of a system environment 400 used for performing the method 300. The system environment 400 includes a risk exposure system 404, described in detail in FIG. 4B, a network 408, a baseline database 412 and an asset database 416.

The network 408 is configured to permit communication between the risk exposure system 404 and other information sources, such as the baseline database 412 and the asset database 416. The network 408 may comprise any combination of local area and/or wide area networks, using both wired and wireless communication systems. In one embodiment, the network 408 uses standard communications technologies and/or protocols. Thus, the network 408 may include links using technologies such as Ethernet, 802.11, worldwide interoperability for microwave access (Wi-MAX), 3G, 4G, CDMA, digital subscriber line (DSL), etc. Similarly, the networking protocols used on the network 408 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 408 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec).

The baseline database 412 includes geographic, geologic, political, and demographic data collected by public and/or private sources to describe and characterize environments in which assets are disposed. The baseline database 412 and the information therein can be accessed by the risk exposure system 404 for information regarding baseline features discussed above.

In one example, the baseline database 412 is a GIS database that can provide data renderable into a graphic format (i.e., a map) and also provide meta-data that can be further used by the risk exposure system 404 to quantify risks posed by baseline features. For example, some meta-data includes seasonal fluctuations in water levels (such as in stream 204), traffic patterns (for example, used to quantify the risk exposure to perishable freight transported by truck), crime rates, and data that can otherwise influence risk exposure. The number of meta-data elements can include size or position of an asset or a feature of an asset in multiple dimensions (height, width, depth, diameter, circumference), construction/composition (concrete, metal, plastic, optical fibers), operating capacities by season, minimum or maximum operational limits associated with the asset (e.g., volume, pressure, frequency, flow rate), fragility, alternative routes, age, useful life, accuracy of location, directionality of flow (e.g., one way or bidirectional), ownership status (partially or wholly owned), commodity or cargo type, identifying names, geopolitical references, and other information.

The asset database 416 stores data used by the risk exposure system 404 to quantify the risk to an asset, or portion thereof. The data stored by the asset database 416 includes the meta-data described above that includes, but is not limited to, GPS coordinates, latitude/longitude of the asset, asset type (e.g., moveable, network, electrical grid substation, train car, inventory shipment), and other characteristics.

Figure 4B:
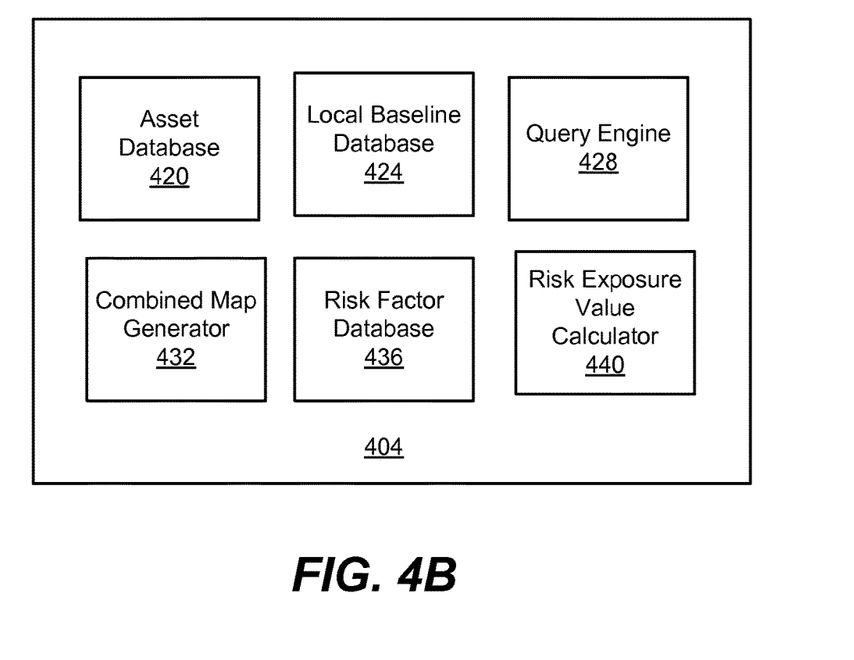

FIG. 4B illustrates a system architecture of the risk exposure system 404 used for calculating a risk exposure value of an asset portion, as described above. The system architecture of the risk exposure system 404 includes an asset database 420, a local baseline database 424, a query engine 428, a combined map generator 432, a risk factor database 436, and a risk exposure value calculator 440.

The asset database 420 stores meta-data associated with network assets, moveable assets, or other assets that are distributed and not otherwise associated with a single, fixed, street address. As described above, the meta-data describing the asset and stored in the asset database 420 includes the geospatial representations of the various asset portions or sub-assets, the relationship or connection between the various portions of the assets to each other and the asset as a whole, types, and other similar characteristics or data used for the calculation of a risk exposure value. As with the other databases described below, the asset database 420 can be a relational database or other type of data storage system used to store and retrieve data.

Similar to the asset database 420, the local baseline database 424 stores data characterizing baseline features and the risks that the features pose to the asset portions. Where the baseline database 412 described above is an external database operated by a third party, such as a government GIS database documenting the geographic limits of 20-year flood zones, the local baseline database 424 permits the risk exposure system 404 to record and access information regarding baseline risks identified by or recorded in the system 404 separately from the baseline database 412. For example, referring again to FIG. 2, if the rail switching yard 108 is known to flood more frequently than would be indicated by data related to the stream 204 and stored in baseline database 412, this data can be stored at the local baseline database 424 for use in the risk exposure value calculation.

Not only can private observations that enhance the understanding of publicly known risks be stored in the local baseline database 424, but also risks known privately to the operator of the risk exposure system 404 can also be recorded in the local baseline database. For example, risks specific to the asset itself (e.g., chemical spill, explosion, theft, arson) can be entered into the baseline database 424 and used in the calculation of a risk exposure value. Similarly, the proximate location of risks that compounds the risk exposure value of other risks can be identified. That is, the presence of hazardous waste, chemicals, or other volatile hazards has inherent risk, but also increases the risk exposure value of separate, but related, risks. For example, a train carrying hazardous waste that derails causes more damage than a train carrying plywood.

The query engine 428 is configured to communicate with data sources external to the risk exposure system 404, such as the baseline database 412 and the asset database 416. In one example, the query engine 428 is an application programming interface ("API") that provides functionality for exchanging data between the risk exposure system 404 and, for example, the baseline database 412 and the asset database 416.

The combined map generator 432 receives data from the asset database 420 regarding a particular asset, and also receives data from the local baseline database 424 for a range of baseline features proximate to the asset geolocation. The combined map generator 432 may also receive data from the query engine 428 that is relevant to the asset and the baseline feature but is stored externally to the system 404. The combined map generator 432 identifies intersections of asset portions or sub-assets and baseline features, thereby associating a risk factor from a specific baseline feature relevant to a specific asset portion or sub-asset. As described above, the benefit of this is that risks specific to an asset portion are associated with the portion and not generic to the asset as a whole. The combined map generator can optionally produce a graphic depiction of the asset portion and the baseline feature, as well as their intersection, on a geographic, geologic, demographic, or political map. Furthermore, the combined map generator 432 can generate geographic representation points without using a variable resolution grid or baseline map, instead creating a geographic representation point of the asset at regular intervals between a starting point and an endpoint.

The risk factor database 436 is used in connection with the combined map generator 432 to quantify the risk factor to the asset that is posed by the baseline feature by providing a weight to the associated risk. These weights are used to differentiate the geographic representation points using the meta-data associated with each point. That is, the weights are used to determine, in part, the risk exposure value allocated to each point.

Depending on the implementation environment, various weighting schemes are used in various embodiments. The weights can be applied to various geographic representation points using rules, asset values, or conditions provided by a user and/or automatically inferring the weights from the meta-data. For example, a geographic representation point associated with a train rail crossing a river can have a higher weight than a rail crossing an infrequently used or geographically remote road. In another example, risks of an interruption to the operations of a business caused by a delivery delay can be weighted based on the location of the delay relative to the delivery point, the downstream business impacts that compound upon a delay, and other factors. Also, because of the variability in quality and quantity of meta-data, weights can be used as proxies for missing meta-data, or as an override for existing meta-data as applied to asset values instead of a geographic representation point. As described above, multiple weights associated with a geographic representation point can be multiplied to provide a single weight for a point.

The risk exposure value calculator 440 then calculates a risk exposure value using the meta-data stored in the asset database 420, the various weighing factors, the local baseline database 424, and the risk factor database 436. The calculation involves two sets of weights, one from the combined map generator 432 and one from the risk factor database 436, and a value of an asset from the asset database 420. In one implementation, weights from 436 are applied against to the asset value first, causing an interim asset value allocation across a group or a type of geographic representation points. Weights for individual points within the group or type are then applied to the interim asset values, thus generating a risk exposure value for each point. In some embodiments, weights are provided relative to some normalized level, such as a dynamically determined normalization point allowing good dynamic range of weights above and below the normalization point. Depending on application, weighting factors may be provided as input to the system in multiple forms (currency, percents, time, etc.); those skilled in the art will recognize that conversion to common forms may be required in such situations. In other environments, multiple forms may be supported directly (e.g., normalization points may be specified in both miles and kilometers to avoid the need to convert individual measurements that may be supplied in either format).

Supply Chain Management Example

The described systems and methods can also be applied in other contexts in which portions or elements of a network have varying inputs and/or outputs. For example, discrete restaurant locations can have raw material needs that vary as a function of season, geography, customer demographics, location, or other factors, including dependencies on public/commercial infrastructure and access to and/or from suppliers and customers. The systems and methods described above can be used to record meta-data describing the particular needs and/or patterns of the discrete locations, and provide the locations with supplies appropriately.

Continuing with the example of a set of discrete restaurants in a geographically distributed network of restaurants, a specific restaurant may be situated in a climatically warm area near a controlled-access highway access point. Because of its location near the controlled-access highway, the restaurant may consume some supplies at rates different from those of other restaurants in the same network but located in town centers. Each will also have different opportunity for re-supply because of different access to transportation infrastructure. For example, the restaurant near the controlled-access highway may consume more materials used for drive-through delivery of food than a restaurant in a town center that hosts more dine-in customers. The restaurant near the controlled-access highway is much more subject to variances in business given construction on the highway than a restaurant in the town center. Similarly, the restaurant in a town center is much more likely to have power restored more quickly following an outage, given its proximity to population, than the restaurant near the controlled-access highway.

Using the system and methods described above, meta-data describing the consumption patterns of various supplies by the different restaurants can be stored in the asset database 420. For example, the part numbers of the various supplies, their consumption rates, the variation of the consumption rate as a function of time of year, local supplies, and other similar information can be stored in the asset database 420. Similarly, risks to the supply, average delivery times, common carrier costs and non-delivery rates, power outage impacts can be stored in the local baseline database 424.

The other elements of the system then function in substantially the same way as described above to determine the risk exposure value of a missed shipment as well as the risk exposure value of over-supplying the restaurant or carrying excess inventory at the restaurant. These competing factors can then be balanced in the order-fulfillment and shipment process and other business planning processes such as on-site power generation.

Computing Device

Figure 5:
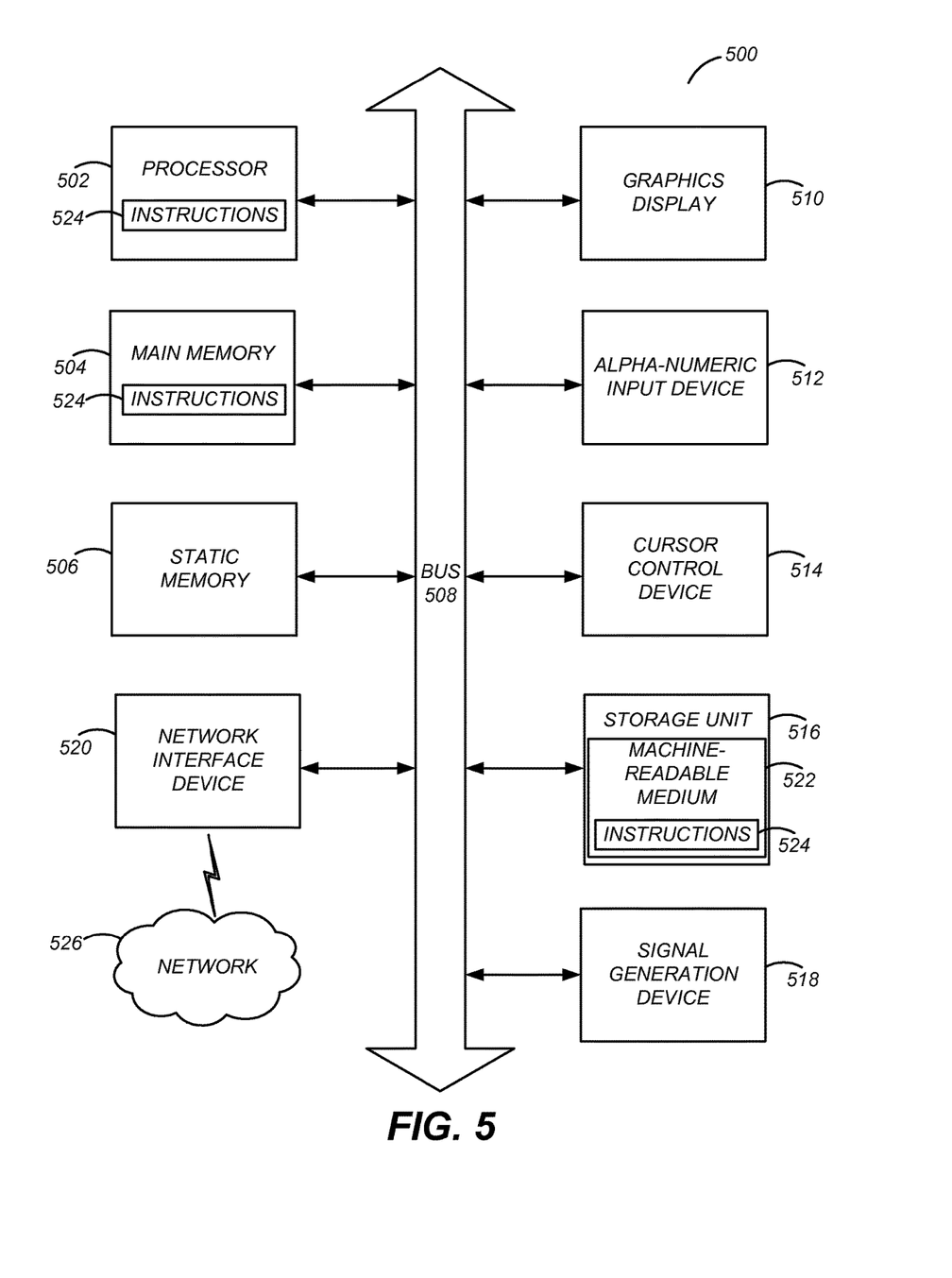
FIG. 5 is a block diagram illustrating components of an example machine able to read instructions from a machine-readable medium and execute them in a processor (or controller) according to one embodiment.

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which instructions 524 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include graphics display unit 510 (e.g., a plasma display panel (PDP), a liquid crystal display (LCD), a projector, or a cathode ray tube (CRT)). The computer system 500 may also include alphanumeric input device 512 (e.g., a keyboard), a cursor control device 514 (e.g., a mouse, a trackball, a joystick, a motion sensor, or other pointing instrument), a storage unit 516, a signal generation device 518 (e.g., a speaker), and a network interface device 820, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Risk exposure system 404, as well as its constituent components asset database 420, local baseline database 424, query engine 428, combined map generator 432, risk factor database 436 and risk exposure value calculator 440 are, in various embodiments, implemented using one or more computers configured such as computer 500 discussed above. Those of skill in the art will recognize that based on processing requirements, several various components may be implemented on a common one of such computers, or several of such computers can operate in a collaborative fashion to implement one or more of such components.

Other Considerations

While particular embodiments are described, it is to be understood that modifications will be apparent to those skilled in the art without departing from the spirit of the invention described herein. The scope of the invention is not limited to the specific embodiments described herein. Other embodiments, uses and advantages of the invention will be apparent to those skilled in art from consideration of the specification and practice of the embodiments disclosed herein.

The embodiments herein have been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement various embodiments may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the embodiments in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the described embodiments include process steps and instructions described herein in the form of an algorithm. It should be noted that various of the process steps and instructions disclosed herein could be embodied in software, firmware or hardware, and when embodied in software, could be downloaded to reside on and be operated from different platforms used by real time network operating systems.

The described embodiments also relate to an apparatus for performing the operations herein. This apparatus may be specially constructed for the various purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the described embodiments are not described with reference to any particular programming language. It is appreciated that a variety of programming languages may be used to implement the teachings as described herein.

The described embodiments are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the invention.

What is claimed is:

1. A computer-implemented method for determining an exposure value of a network asset, comprising:

representing the network asset using a first geographic representation, the first geographic representation representing a network asset, wherein the network asset comprises a continuously distributed infrastructure;

storing first meta-data in an asset database in association with the first geographic representation, the first meta-data associating portions of the continuously distributed infrastructure with first characterizing information describing respective portions of the continuously distributed infrastructure;

representing a plurality of baseline features using a second geographic representation, wherein each baseline feature describes a context of the network asset;

storing second meta-data in a baseline database in association with the second geographic representation, the second meta-data associating each baseline feature of the plurality of baseline features with a location and second characterizing information describing the baseline feature;

at least one of the first geographic representation and the second geographic representation comprising a first portion represented at a first resolution and a second portion represented at a second resolution, wherein the second resolution is higher than the first resolution;

generating a plurality of geographic representation points by:

generating, based on the first geographic representation and the second geographic representation, a third geographic representation identifying intersections between the continuously distributed infrastructure and the plurality of baseline features;

determining, based on the third geographic representation, a plurality of intersection points, wherein a density of intersection points at each location corresponds to a resolution of the first geographic representation and the second geographic representation at the each location;

generating, for each intersection point of the plurality of intersection points, a geographic representation point, wherein the geographic representation point represents an intersection between a particular portion of the continuously distributed infrastructure at the intersection point and a risk posed by a baseline feature at the intersection point;

wherein the second characterizing information includes a risk type and the one or more characterizing values includes a risk value, wherein the second portion adds resolution to a particular baseline feature of the plurality of baseline features, and increasing the number of geographic representation points used to describe the particular baseline feature responsive to the risk type indicating elevated risk posed by the particular baseline feature relative to other baseline features;

for each geographic representation point of the plurality of geographic representation points:

querying the asset database to retrieve first meta-data associated with a location of the geographic representation point;

querying the baseline database to retrieve second meta-data associated with the location of the geographic representation point;

based on the first meta-data and the second meta-data associated with the location of the geographic representation point, calculating an asset value and one or more characterizing values, wherein each characterizing value describes one or more risk factors associated with the geographic representation point; and calculating a risk exposure value for the geographic representation point by applying the one or more characterizing values to the asset value;

wherein the method is performed by one or more computing devices.

2. The method of claim 1, wherein calculating the one or more characterizing values comprises calculating at least one characterizing value using a user-defined characterizing value.

3. The method of claim 1, wherein the first geographic representation comprises the first portion and the second portion, wherein the second portion adds resolution to a portion of the continuously distributed infrastructure and the method further comprising increasing the number of geographic representation points used to describe the portion of the continuously distributed infrastructure.

4. The method of claim 1, wherein the first geographic representation comprises one or more line segments.

5. The method of claim 1, wherein the first geographic representation comprises one or more polygons.

6. The method of claim 1, wherein a weighing function is applied to each geographic representation point.

7. The method of claim 6, wherein the weighing function is a function of asset value.

8. The method of claim 1, wherein calculating the risk exposure value for the geographic representation point comprises calculating a composite system-determined and user-defined weighting function for the geographic representation point and applying the composite weighting function for the geographic representation point to the asset value.

9. A system comprising:

a non-transitory computer-readable medium that includes instructions that, when loaded into memory, cause a processor to perform a method, the method comprising:

representing a network asset using a first geographic representation, the first geographic representation representing the network asset, wherein the network asset comprises a continuously distributed infrastructure;

storing first meta-data in an asset database in association with the first geographic representation, the first meta-data associating portions of the continuously distributed infrastructure with first characterizing information describing respective portions of the continuously distributed infrastructure;

representing a plurality of baseline features using a second geographic representation, wherein each baseline feature describes a context of the network asset;

storing second meta-data in a baseline database in association with the second geographic representation, associating each baseline feature of the plurality of baseline features with a location and second characterizing information describing the baseline feature;

at least one of the first geographic representation and the second geographic representation comprising a first portion represented at a first resolution and a second portion represented at a second resolution, wherein the second resolution is higher than the first resolution;

generating a plurality of geographic representation points by:

generating, based on the first geographic representation and the second geographic representation, a third geographic representation identifying intersections between the continuously distributed infrastructure and the plurality of baseline features;

determining, based on the third geographic representation, a plurality of intersection points, wherein a density of intersection points at each location corresponds to a resolution of the first geographic representation and the second geographic representation at the each location;

generating, for each intersection point of the plurality of intersection points, a geographic representation point, wherein the geographic representation point represents an intersection between a particular portion of the continuously distributed infrastructure at the intersection point and a risk posed by a baseline feature at the intersection point;

wherein the second characterizing information includes a risk type and the one or more characterizing values includes a risk value, wherein the second portion adds resolution to a particular baseline feature of the plurality of baseline features, and increasing the number of geographic representation points used to describe the particular baseline feature responsive to the risk type indicating elevated risk posed by the particular baseline feature relative to other baseline features;

for each geographic representation point of the plurality of geographic representation points:

querying the asset database to retrieve first meta-data associated with a location of the geographic representation point;

querying the baseline database to retrieve second meta-data associated with the location of the geographic representation point;

based on the first meta-data and the second meta-data associated with the location of the geographic representation point, calculating an asset value and one or more characterizing values, wherein each characterizing value describes one or more risk factors associated with the geographic representation point; and calculating a risk exposure value for the geographic representation point by applying the one or more characterizing values to the asset value.

10. The system of claim 9, wherein calculating the one or more characterizing values comprises calculating at least one characterizing value using a user-defined characterizing value.

11. The system of claim 9, wherein the first geographic representation comprises the first portion and the second portion, wherein the second portion adds resolution to a portion of the continuously distributed infrastructure and the method further comprising increasing the number of geographic representation points used to describe the portion of the continuously distributed infrastructure.

12. The system of claim 9, wherein the first geographic representation comprises one or more line segments.

13. The system of claim 9, wherein the first geographic representation comprises one or more polygons.

14. The system of claim 9, wherein a weighing function is applied to each geographic representation point.

15. The system of claim 14, wherein the weighing function is a function of asset value.

16. The system of claim 9, wherein calculating the risk exposure value for each geographic representation point comprises calculating a composite system-determined and user-defined weighting function for each geographic representation point, across all geographic representation points, and applying each composite weighting function for each geographic representation point to the asset value.

17. A computer program product stored on a non-transitory computer-readable medium that includes instructions that, when loaded into memory, cause a processor to perform a method, the method comprising:

representing a network asset using a first geographic representation, the first geographic representation representing a network asset, wherein the network asset comprises a continuously distributed infrastructure;

storing first meta-data in an asset database in association with the first geographic representation, the first meta-data associating portions of the continuously distributed infrastructure with first characterizing information describing respective portions of the continuously distributed infrastructure;

representing a plurality of baseline features using a second geographic representation, wherein each baseline feature describes a context of the network asset;

storing second meta-data in a baseline database in association with the second geographic representation, associating each baseline feature of the plurality of baseline features with a location and second characterizing information describing the baseline feature;

at least one of the first geographic representation and the second geographic representation comprises a first portion represented at a first resolution and a second portion represented at a second resolution, wherein the second resolution is higher than the first resolution;

generating a plurality of geographic representation points by:

generating, based on the first geographic representation and the second geographic representation, a third geographic representation identifying intersections between the continuously distributed infrastructure and the plurality of baseline features;

determining, based on the third geographic representation, a plurality of intersection points, wherein a density of intersection points at each location corresponds to a resolution of the first geographic representation and the second geographic representation at the each location;

generating, for each intersection point of the plurality of intersection points, a geographic representation point, wherein the geographic representation point represents an intersection between a particular portion of the continuously distributed infrastructure at the intersection point and a risk posed by a baseline feature at the intersection point;

wherein the second characterizing information includes a risk type and the one or more characterizing values includes a risk value, wherein the second portion adds resolution to a particular baseline feature of the plurality of baseline features, and increasing the number of geographic representation points used to describe the particular baseline feature responsive to the risk type indicating elevated risk posed by the particular baseline feature relative to other baseline features;

for each geographic representation point of the plurality of geographic representation points:

querying the asset database to retrieve first meta-data associated with a location of the geographic representation point;

querying the baseline database to retrieve second meta-data associated with the location of the geographic representation point;

based on the first meta-data and the second meta-data associated with the location of the geographic representation point, calculating an asset value and one or more characterizing values, wherein each characterizing value describes one or more risk factors associated with the geographic representation point; and calculating a risk exposure value for the geographic representation point by applying the one or more characterizing values to the asset value.

18. The computer program product of claim 17, wherein calculating the one or more characterizing values comprises calculating at least one characterizing value using a user-defined characterizing value.

19. The computer program product of claim 17, wherein the first geographic representation comprises the first portion and the second portion, further comprising using the second portion for adding resolution to a portion of the continuously distributed infrastructure and increasing the number of geographic representation points used to describe the portion of the continuously distributed infrastructure.

20. The computer program product of claim 17, wherein the first geographic representation comprises one or more line segments.

21. The computer program product of claim 17, wherein the first geographic representation comprises one or more polygons.

22. The computer program product of claim 17, wherein a weighing function is applied to each geographic representation point.

23. The computer program product of claim 22, wherein the weighing function is a function of asset value.

24. The computer program product of claim 17, wherein calculating the risk exposure value for each geographic representation point comprises calculating a composite system-determined and user-defined weighting function for each geographic representation point, across all geographic representation points, and applying each composite weighting function for each geographic representation point to the asset value.

* * * * *